(12) United States Patent
Broddin et al.

(10) Patent No.: US 7,231,096 B2
(45) Date of Patent: *Jun. 12, 2007

(54) SCREENING METHOD FOR OVERLAPPING SUB-IMAGES

(75) Inventors: Dirk Broddin, Edegem (BE); Mario Verbruggen, Baal (BE); Serge Tavernier, Lint (BE)

(73) Assignee: Agfa-Gevaert N.V., Mortsel (BE)

( * ) Notice: Subject to any disclaimer, the term of this patent is extended or adjusted under 35 U.S.C. 154(b) by 493 days.

This patent is subject to a terminal disclaimer.

(21) Appl. No.: 10/695,118

(22) Filed: Oct. 28, 2003

(65) Prior Publication Data

US 2004/0085587 A1 May 6, 2004

(51) Int. Cl.
*G06K 9/40* (2006.01)
*G06K 9/36* (2006.01)

(52) U.S. Cl. ............... 382/254; 382/266; 382/267; 382/284

(58) Field of Classification Search ............... 382/162, 382/189, 254, 266, 267, 268, 284; 358/1.9–3.32, 358/540, 456, 450; 347/3, 212, 188, 196
See application file for complete search history.

(56) References Cited

U.S. PATENT DOCUMENTS

| | | | | |
|---|---|---|---|---|
| 4,616,262 A | * | 10/1986 | Toriumi et al. | 348/597 |
| 5,640,254 A | * | 6/1997 | Sexton | 358/536 |
| 5,766,807 A | * | 6/1998 | Delabastita et al. | 430/6 |
| 5,818,604 A | * | 10/1998 | Delabastita et al. | 358/3.19 |
| 6,215,914 B1 | * | 4/2001 | Nakamura et al. | 382/284 |
| 6,690,837 B1 | * | 2/2004 | Broddin et al. | 382/254 |

FOREIGN PATENT DOCUMENTS

| | | |
|---|---|---|
| EP | 0517543 | 12/1992 |
| EP | 0522980 | 1/1993 |
| EP | 0529535 | 3/1993 |
| EP | 0619188 | 10/1994 |
| EP | 0634862 | 1/1995 |
| EP | 0642258 | 3/1995 |
| EP | 0675417 | 10/1995 |
| EP | 0677383 | 10/1995 |
| EP | 0680195 | 11/1995 |
| EP | 0682438 | 11/1995 |
| EP | 0709802 | 5/1996 |
| EP | 0748109 | 12/1996 |

* cited by examiner

*Primary Examiner*—Matthew C. Bella
*Assistant Examiner*—Brian Le
(74) *Attorney, Agent, or Firm*—Robert A. Sabourin

(57) ABSTRACT

A method and system for reproducing an image on a carrier, the method includes: generating a conjoined first and second sub-image, each representative for a portion of the image; defining an overlap region where both sub-images give a contribution to the internal optical density of the carrier; dividing the overlap region in a partition of microdots; establishing for each sub-image a peripheral edge in the overlap region; increasing the contribution by the first sub-image from the peripheral edge of the first sub-image to the peripheral edge of the second sub-image; and assigning to at least one microdot an intermediate microscopic density different from a minimum or maximum microscopic density of microdots; wherein the contribution increases the microscopic density of the microdots by density steps smaller than half the difference between the minimum and maximum microscopic densities of the microdots.

2 Claims, 7 Drawing Sheets

SCREENING METHOD FOR OVERLAPPING SUB-IMAGES

FIELD OF THE INVENTION

The present invention relates to an image reproduction method by joining adjacent images, such as two or more image bands, in an image generating device, such as a printer.

BACKGROUND OF THE INVENTION

Nowadays many types of image generating devices exist, including phototypesetters, imagesetters, lithographic printers and electronic printers for printing electronic (colour) images. The generated images may be e.g. latent, visible or lithographic and are generated on a suitable image carrier. An image carrier may be paper, a transparent PET (polyethyleenterephtalate) material, photographic material, an electrophotographic drum or a lithographic printing plate etc. A non-visible image usually undergoes a process to generate a visible image from it: a latent image may be developed; a lithographic image, comprising ink accepting and ink repellent zones, may be provided with ink, which is transferred to a paper image carrier to render a visible image.

Some printers use thermal processes to form an image. These may be direct thermal systems, thermal (wax) transfer system or thermal systems using dye sublimation to form images on a receiving material or image carrier. The thermal process can be activated by using a thermal head or infrared (IR) light sources. An IR light source commonly used in laser thermal printers is a semiconductor laser. Other popular printing systems use an ink jet printing technology. Droplets of fluid ink are ejected to a receiving layer or image carrier to form a visible image.

A very common type of printer in the office environment is a printer using an electrographic process. According to the electrophotographic process, which is a specific electrographic process, a latent electrostatic image is formed by selectively illuminating or exposing an electrostatically charged photoconductive drum and developing the latent image by toner, thereby producing a visual toner image. The toner may thereafter be transferred to an image carrier or substrate made of e.g. paper.

Another electrographic process is referred to as Direct Electrographic Printing (DEP) and is described in e.g. EP-A-0 675 417. According to this technique, a toner cloud is brought in the vicinity of a print head structure. That structure has apertures that may be "opened or closed" by electrostatic action. By image-wise opening these apertures, toner particles travel image-wise through the apertures of the print head structure and impinge on an image substrate such as an intermediate image drum or a final image substrate such as paper or a transparency material. Most of the above mentioned printers use print heads: these are units carrying the image-forming or image-generating elements, and which e.g. provide the heath, emit light or eject ink or toner particles in an image wise fashion.

A print head is generally not capable to generate at once the complete image on the image carrier. For generating an image, the area of the image carrier is traditionally (mentally) partitioned in tiny addressable units, referred to as microdots. These microdots are disjunctive, i.e. they do not overlap each other, and all the microdots together fill the complete image area on the carrier. As such, they form a real partition of the image carrier. The microdots may be obtained by a grid defined by a first set of parallel equidistant lines having a first orientation and a second set of equidistant parallel lines having a second orientation different from the first orientation. The tiny parallelogram areas, enclosed by two sets of two parallel line portions, are referred to as microdots. If the second orientation is orthogonal to the first orientation, then the microdots have a rectangular shape. If the distance between two consecutive lines of the first set equals to such distance of the second set, then the microdots have a rhombic shape. In most cases the orientation is orthogonal and the distance is identical, resulting in square microdots. The multiplicative inverse of the size of the side of a square microdot is referred to as the spatial resolution of the imaging device. The microdot size in an electrophotographic device may be 42 micron ($\mu$m). The spatial resolution of the device is then 1000/42 microdots per mm, i.e. 24 dots per mm or 600 dots per inch (600 dpi). The notion of an "addressable" microdot refers to the fact that the imaging device is capable to address the microdot individually. A binary electrographic device is capable to deposit either a maximum amount of toner or a minimum amount of toner on each individual microdot.

Although the microdots are disjunctive, is may be possible that some toner particles designated for a first microdot, also partly cover an adjacent microdot, i.e. a microdot that has a side or a corner in common with the first microdot. Examples of such binary devices are the Agfa P400, P3400 and P3400PS devices, developed and marketed by Agfa-Gevaert N. V. in Mortsel, Belgium and having a resolution of 400 dpi. A multilevel electrographic device is capable to deposit on each individual microdot specific variable amounts of toner, expressed in microgram per square millimeter ($\mu$g/mm$^2$). The number of such specific amounts may be e.g. 16, such as in the Chromapress system, developed and marketed by Agfa-Gevaert N. V. in Mortsel. The lowest amount of toner may be generated by offering to the electrophotographic system a digital value 0, whereas the highest amount of toner may be generated by offering to the electrophotographic system a digital value 15. All values between 0 and 15 may generate on the individually addressed microdot each a specific amount of toner between said minimum and maximum amount. Since values from 0 to 15 may be represented by four bits, this system is referred to as a 4-bit multilevel system. To achieve the impression of continuous tone for images reproduced on such system, it may be necessary to introduce some form of halftoning, as described in EP-A-0 680 195, EP-A-0 634 862 and EP-A-0 682 438.

It follows that an A4-sized image carrier (297 mm×210 mm) comprises about 35 million microdots in a 600 dpi (ca. 24 microdots per mm) system. An imagesetter for generating a printable image may have a spatial resolution of 2400 dpi (ca. 95 microdots per mm). If the film or printing plate has a size of 14"×17" (14 inch by 17 inch, i.e. 356 mm by 432 mm), the number of microdots on the image carrier amounts to 1,371 million. An imaging device capable to address that large number of microdots at once and at that resolution would be too costly. Therefore, the image carrier is rather exposed line by line, e.g. by using a LED array or even pixel by pixel—i.e. microdot by microdot—by using a sweeping laser beam. A sweeping laser beam may be generated by an imaging device comprising a laser source and a light deflection system such as a rotating polygonal mirror or a rotating pentaprism. In more complex systems, all microdots arranged on a plurality of lines may be addressed at once, i.e. at the same instant. This may be achieved by a plurality of parallel LED arrays in an electrophotographic system and by a print head structure having a plurality of parallel lines of printing apertures in a DEP device. A plurality of sweeping laser beams may give the imaging device the capability to address a plurality of microdots at once. According to the above mentioned systems, one imaging device—i.e. one LED array, one printhead structure, or one laser beam system comprising a laser source and a deflection means—is capable to address one line of microdots simultaneously or at least within a short period of time. With that short period is meant the time to address all the microdots of one line, without addressing within that period other lines by the same imaging device.

Due to the cost of some complex devices, it is sometimes too expensive to provide a print head having a length equal or larger than the width of the recording material. For some technologies it is even impossible to make a good quality print head of a large size. As such, the shorter print head cannot address instantly all microdots arranged on one line running from one side to the opposite side of the image carrier.

Especially when printing a large size image, e.g. posters, the print head can print only a portion of the image. A poster may have a size of 1.5 m width and 2.5 m length. In a 75 dpi system, state of the art systems have a printing head with a width of 30 cm. To cope with a poster width of 150 cm, the printing head has to make at least five steps. Therefore the image is printed in several parallel bands, referred to as sub-images, which are sequentially printed alongside each other.

In an inkjet printer having an array of nozzles arranged in a longitudinal direction parallel to the longer side of the paper to be printed, the paper is fed stepwise relative to the print head in a longitudinal direction. The print head has a transversal shuttle movement relative to the paper for printing image bands by simultaneous operation of the plurality of nozzles. The bands are printed one after another. A first image band or sub-image is printed during a first transversal shuttle movement. Thereafter, the paper is moved stepwise in a first longitudinal movement. Then the second sub-image is printed during a second transversal shuttle movement, followed by a second longitudinal stepwise movement etc.

In a thermal laser transfer printer the imaging material can be mounted on a drum. While the drum is rotated the print head is stepwise moved along the rotation axis printing the image band sequentially alongside each other. One such printer is described in WO 93/04 552 where a thermal print head carrying diode lasers coupled to fibres is displaced alongside the rotatable drum.

Sequentially printing the image in bands or sub-images may give the following problems.
1. When image bands do not exactly join together it is possible that a distinct white line in between the printed bands becomes clearly visible as an image defect. On the other hand, when the image bands overlap, a clearly visible dark line disturbs the image.
2. Even when print bands join perfectly along the length, a slight mismatch in the position of the bands along this length can cause visible artefacts.

As can be seen in FIG. 2, the mismatch due to displacement of a first sub-image 21 relative to a second sub-image 22 according to the size of only one microdot can cause a visible defect when printing screened (binary) images. This is referred to as a phase defect of the screened data.

The artefacts, caused in the image zone 26 where two sub-images join, may find their origin in the imperfect placement of the printing head for printing the second sub-image in relation to the first printed sub-image. This may be due to play of the mounting and moving system of the printing head.

The very accurate positioning systems, needed to solve the above problem, are too expensive to install in the printers destined to the consumer market.

The above problems have already been recognised by other researchers and several solutions have been proposed.

In EP-A-0 522 980 and EP-A-0 619 188 there is proposed to make an overlap zone of two printed bands in a thermal sublimation printer where two fitting stochastic rasters gradually fade towards the neighbouring band.

In a laser thermal transfer proofer described in EP-A-0 529 535 and WO 93/4 552 the outermost lines of each band are so called "dummy" lines. The information recorded in these lines has the purpose to avoid the occurrence of white side lines due to incorrect placement.

In DE-A-4 110 776 the joining of the bands in an ink jet printer using a shuttling print head is not done along a straight line but along a curved (random) path.

Despite of all the proposed measurements hitherto, there is still a need to obtain a good quality joining of printed bands.

OBJECTS OF THE INVENTION

It is an object of the invention to provide a method for the reproduction of an original image including high quality joining of two sub-images that are printed sequentially by one imaging device or that are printed by two different imaging devices.

SUMMARY OF THE INVENTION

The above mentioned objects are realised by a method having the specific features defined in claim 1. Specific features for preferred embodiments of the invention are set out in the dependent claims.

The original image may be an image of a real scene, captured e.g. by a photographic camera or a digital camera. The original image may also be an image on black and white or colour print material. Such an image may be converted to an electronic image by an image scanner, such as the Agfa SelectScan™ digital scanner. Such electronic image may also be designated as an original image. An original image may also originate from a software application such as PhotoShop (Trademark of Adobe Inc.), for creation or modification of original or synthetic images. An original electronic image may represent a black and white image or a colour image. An electronic image is traditionally represented as one or more rectangular matrices of image pixels, wherein each pixel is represented by a digital value. The digital value typically ranges from 0 to 255, where 0 may represent dark and 255 may represent light or vice versa. Colour images are usually represented by three matrices, each matrix representing a colour component such as red, green, blue; or cyan, magenta, yellow; or hue, intensity, saturation; etc. Where the current invention refers to an original image, the following may i.a. be referred to: the electronic representation of a black and white continuous tone image, of one colour component of a continuous tone image.

An image carrier is e.g. paper; transparent or opaque film material, such as PET, etc. on which the reproduction is made visible. Before the image is visible, several intermediate operations may be needed, such as developing a latent image, applying ink to a lithographic medium and printing on paper, etc.

A sub-image is an image that is a portion of the original image or a derivative thereof. If an electronic image comprises 512 pixels on 512 lines, then a first sub-image may comprise 300 pixels on 512 lines, e.g. pixels 1 to 300 for each line of the original image and a second sub-image may also comprise 300 pixels on 512 lines, e.g. pixels 213 to 512 for each line of the original image.

According to the current invention, the first and second sub-image are conjoined, i.e. they have a common region. According to the above example, the first and second sub-images have pixels 213 to 300, i.e. 88 pixels, for each line in common, i.e. 88*512=45, 056 pixels. The first and second sub-image must be representative for a portion of the original image, i.e. it is possible to reproduce at least a portion of the original image on an image carrier by the first and the second sub-image.

The overlap region is defined as a region on the final carrier, i.e. where the reproduction of the original image is visible. In the overlap region, both the first sub-image and the second sub-image give a contribution to the integral optical density of the image carrier. By image carrier is meant the substrate of the carrier (e.g. paper, PET, . . . ) along with the toning agent, e.g. toner, ink, black silver (as opposed to e.g. white silver salt such a silver behenate, which is transformed to black silver by a thermal reaction), etc. Application of the toning agent to the substrate, changes the optical density of the image carrier at the location where the agent is applied. The optical density may be measured by a densitometer. According to the spot diameter, two types of densitometers may be distinguished: traditional densitometers, having a spot diameter of 3 mm typically, and 2 or 1 mm exceptionally; and, microdensitometers capable to measure the optical density of a spot having a diameter between 10 µm and 400 µm. The optical transmission density is measured by illuminating a transmissive material, e.g. the image carrier carrying an image, and measuring the transmitted light T. The 10-logarithm of the ratio of the incident light I and the transmitted light T is defined as the optical density: $D=\log_{10}(I/T)$. For the definition of the optical reflection density, the reflected light R is used instead of the transmitted light T: $D=\log_{10}(I/R)$. For a large variety of imaging systems, the microdensitometer is capable to measure the density of one individual microdot. This density is referred to as microscopic density. If the microdensitometer is not capable to measure the microscopic density of one microdot, one may print a matrix of e.g. 20×20 identical microdots, and measure the microscopic density of the patch formed by the matrix. The traditional densitometer is not capable to differentiate individual microdots. If all microdots within the spot having a diameter of 3 mm have the same microscopic density, then the densitometer will read that density. If the microdots in that spot have different microscopic densities, the densitometer will read a mean value of these microscopic densities. This process is referred to as optical integration, and the measured optical density is referred to as integral optical density. This process corresponds also to what happens in the human eye, when it captures an image on an image carrier. Therefore, the visual interpretation of an image does not necessarily correspond to the microscopic density, but rather to the integral optical density. For the reproduction of an original image, it is more important that the integral optical density of the reproduction corresponds to the original image, rather than the microscopic density. To the human observer, a screened reproduction may look as pretty as a full continuous tone reproduction, although the microscopic densities of the screened reproduction do not match the integral optical density as observed. The integral optical density for an image consisting of a constant grey colour may also be defined by the mean microscopic density, taken over all microdots of a screen cell. A screen cell for a contone device corresponds to one microdot. For a screened image, a screen cell corresponds to the tile size of the screening method (see e.g. EP-A-0 682 438 for a definition of tiles).

A contribution to the integral optical density is defined as follows. Suppose that the first sub-image is printed alone, without printing second sub-image, on top of the first one. The integral optical density $D_1$ of the image carrier with the first sub-image printed on it is measured, i.e. the final image carrier on which the reproduction is visible. This optical density $D_1$ is the contribution of the first sub-image. By printing the second sub-image alone, the integral optical density $D_2$ on the image carrier may be measured. This is the contribution by the second sub-image. The final optical density D in the overlap region, where both sub-image are imaged on top of each other, will generally obey the following inequalities, although exceptions are possible:

$$D_1, D_2 \leq D \leq D_1 + D_2$$

For colour images, these contributions are measured per component, preferably by a colour densitometer. A colour densitometer is a densitometer including a specific colour filter, e.g. a red, green or blue colour filter. If an image is printed as a cyan, magenta and yellow component, then the contribution by the first sub-image for the yellow component is measured by printing the yellow component of the first sub-image alone, without any other component of the first sub-image, nor any component of the second sub-image. The integral optical density of the yellow component is then preferably measured by a colour densitometer using a blue filter.

A peripheral edge of a sub-image is one of the edges of the perimeter of the sub-image. If the sub-image is rectangular, then the sub-image has four peripheral edges. The peripheral edge in the overlap region, is the edge of the sub-image bordering the overlap region. Stricto sensu the first sub-image usually gives no contribution to microdots on the peripheral edge of the first sub-image, situated in the overlap region, but that that edge is also included in the overlap region.

Increasing the contribution by a sub-image is preferably realised by electronic image processing. This is set out below, mainly in conjunction with FIG. 5. If in an overlap region the contribution by the first sub-image increases, usually the contribution by the second sub-image decreases. The increase and decrease are such that the reproduction resembles the original image. Methods to achieve this are set out below.

BRIEF DESCRIPTION OF THE DRAWINGS

FIG. 6 shows arrangements for test patches generated by a first and second sub-image, along with an overlap region for various percentages of halftone dots FIG. 6*a* shows an arrangement for 100% non-blank halftone dots FIG. 6*b* shows an arrangement for 87.5% non-blank halftone dots FIG. 6*c* shows an arrangement for 75% non-blank halftone dots FIG. 6*d* shows an arrangement for 62.5% non-blank halftone dots FIG. 6*e* shows an arrangement for 50% non-blank halftone dots FIG. 6*f* shows an arrangement for 37.5% non-blank halftone dots FIG. 6*g* shows an arrangement for 25% non-blank halftone dots FIG. 6*h* shows an arrangement for 12.5% non-blank halftone dots

DETAILED DESCRIPTION OF THE INVENTION

Figures 1, 2:
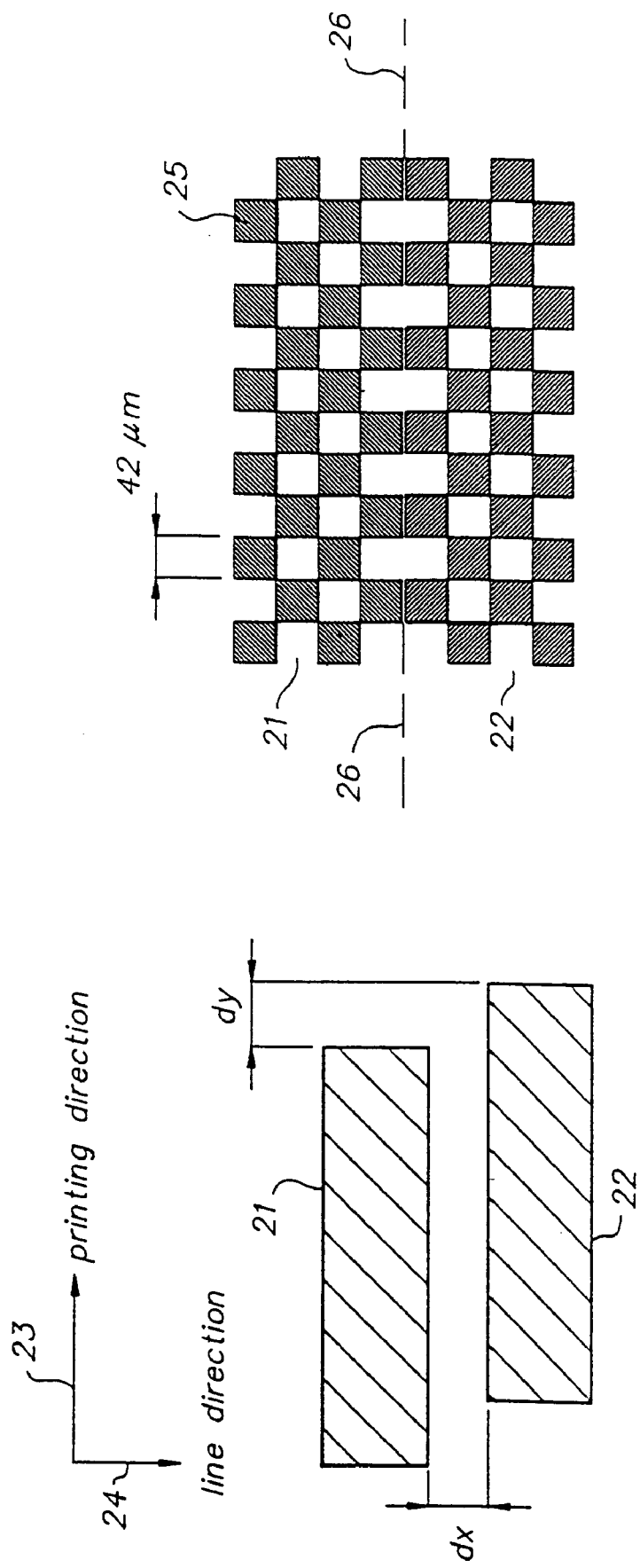
FIG. 1 shows two parallel image bands that are dislocated by dx and dy
FIG. 2 shows the occurrence of a phase defect on the peripheral edge of two screened image bands.

FIG. 1 shows a first sub-image 21 and a second sub-image 22. The first sub-image or image band 21 may be generated by linewise exposure, i.e. parallel to the line direction 24, e.g. by a DEP device having a single row of apertures or by an inkjet device having a row of nozzles. After printing the first line, the imaging device advances according to the printing direction 23 or the image carrier on which the image is to be printed advances in the opposite direction. By iteratively printing and advancing, the sub-image 21 is completely printed. Thereafter, the imaging device is moved towards the second sub-image 22 or the image carrier is displaced relative to the imaging device, such that the imaging device can now print the first line of the second sub-image 22 etc. The two sub-images 21 and 22, materialised by two parallel bands according to this example in FIG. 1, must be joined to get a larger image, e.g. for the production of a poster, larger than the printing capability of the imaging device. The relative displacement of the printing device towards the place on the image carrier where the second sub-image must be printed, may introduce a first dislocation dx according to the line direction 24 and a second dislocation dy according to the printing direction 23. The precision by which dx and dy may be minimised is decisive for the quality of the reproduced image on the carrier in the neighbourhood of the junction between the first and second sub-image 21, 22. The effect of a dislocation dx and dy will be discussed referring to simple original images.

If sub-images 21 and 22 are high density regions, e.g. black, and the dislocation dx equals to the size of one microdot, then a low density line having a width of dx may appear between the two high density sub-images 21 and 22. Such line is clearly visible with a magnifying glass on a 600 dpi system and is even noticed by the naked eye at a viewing distance between 40 and 50 cm.

FIG. 2 shows the situation on a 600 dpi system where the first sub-image 21 is dislocated relative to the second sub-image 22 in the printing direction over a distance dy of 42 μm. Each square area 25 having a size of 42 μm represents a microdot. The microdots within both sub-images 21 and 22 have alternately a high and a low microscopic density according to a chess-board pattern. Both sub-images represent a halftone pattern with a dot percentage of 50%. When seen at real scale by the naked eye, the halftone pattern will look as a solid grey region. Due to the supposed dislocation of 42 μm, corresponding to the size of one microdot, a disturbing pattern is clearly visible in the neighbourhood of the junction 26. Such pattern will be noticed as a grey disturbance when observed at real scale. This type of dislocation is referred to as a phase error. This term refers to the periodicity of halftone screens. The halftone screen 21, 22 has a specific periodicity, characterised by a screen angle and a screen ruling. Both parameters are identical for the sub-images 21 and 22, i.e. the screen angle is 45° and the screen ruling is $600/\sqrt{2}$ dpi. The halftone screen however has also a "starting point", that may be situated in the centre of a microdot having a low density. Due to the periodicity, the starting point may be freely moved about lines oriented according to the screen angle and over distances equal to an integer multiple of the pitch of the screen, where the pitch equals to 1/ruling. It is clear that within sub-image 21 or 22 of FIG. 2 one always arrives to the centre of another low density microdot. However, once the junction 26 is crossed, the starting points do not match. For the example of FIG. 2, the phase shift is maximum and the effect will also be clearly visible.

Also periodical screens, such as a screen referred to as an amplitude modulation (AM) screen, suffer from phase errors even if small dislocations dx or dy are present between the first and second sub-image 21, 22. An amplitude modulation screen is a screen in which halftone dots are arranged on a periodic grid. A periodic grid may be obtained by two sets of parallel and equidistant lines, each set having a specific orientation, usually orthogonal to each other. In areas having a low integral optical density, a halftone dot is a contiguous high density region on a low density background. In areas having a high integral optical density, a halftone dot is a contiguous low density region on a high density background. In low density regions, the area of the (high density) halftone dots grows as the density increases. In high density regions, the area of the (low density) halftone dots reduces as the density further increases. In mid density regions, halftone dots may start to touch each other. As such, for an amplitude modulated screen, the number of halftone dots is constant, whereas the size or area of the halftone dots varies with the tone value of the original image to be reproduced by an arrangement of the halftone dots. This screening technique is more extensively described in e.g. EP-A-0 748 109.

According to another halftoning technique, referred to as frequency modulation (FM) halftone screening, the halftone dots have a fixed size and the number of halftone dots per unit area varies with the tone value of the original image to be reproduced by the halftone image. An FM halftone dot may have the size of one microdot. Also two adjacent microdots, i.e. microdots touching each other by one side, may constitute one microdot. In some systems, a halftone dot in a frequency modulation halftone image, is formed by a cluster of four microdots arranged as a 2×2 matrix. Other arrangements are also used. In low density regions, the high density halftone dots will be sparsely distributed over the image carrier. This distribution may be according to a random pattern. Therefore, this screening technique is also referred to as stochastic screening. As the density of the region increases, the number of halftone dots per unit area on the image carrier increases, rather than the area of the halftone dots. At a certain density of the image to be reproduced, the halftone dots start to touch each other at their corner points or start to connect side by side. Once the density is high enough, no high density halftone dots on a low density background will be visible anymore, but low density halftone dots on a high density background will become visible. At very high densities, the low density microdots will be sparsely distributed on the high density background. This technique of halftoning is described in e.g. EP-A-0 642 258 and EP-A-0 682 438.

The above mentioned techniques of halftoning, i.e. amplitude modulation and frequency modulation, are mainly known for binary printing systems, i.e. systems that have the capability to deposit ink or no ink on a microdot; or to deposit toner or no toner etc. If the printing system, such as the Chromapress system referred to above, has the capability to deposit a restricted number (e.g. 16) of intermediate amounts of toner or ink on each one microdot, then the halftoning techniques may be further refined in that not only the area of the halftone dots or the number of halftone dots per unit area is modified but also the microscopic density of the microdots constituting the halftone dot—or even constituting the background—may be varied. This feature gives an extra degree of freedom that may be used in a suitable way to enhance the reproduction of continuous tone images. Suitable techniques are described in EP-A-0 634 862 and EP-A-0 682 438.

The halftone dots used in frequency modulation (FM) halftoning have usually a size equal to the smallest halftone dots used in amplitude modulation (AM) halftoning. Therefore, for most tone levels to be reproduced, the halftone dots in AM are larger than the halftone dots in FM. On a 600 dpi binary system, the FM halftone dots preferably have a size of 42.3 μm by 42.3 μm; the AM halftone dots require a line ruling of 53 lpi (lines per inch), in order to be capable to reproduce 128 tone levels. The size of such AM halftone dots may be as large as 338 μm by 338 μm. Therefore, a dislocation dy as shown in FIG. 1 may be more visible in AM reproductions than in FM reproductions, having smaller halftone dots. For that reason, at least in the neighbourhood of the junction 26 between two sub-images 21, 22, we have found that it is preferred to use FM halftoning rather than AM halftoning if halftoning is necessary to achieve a faithful reproduction.

Figure 3:
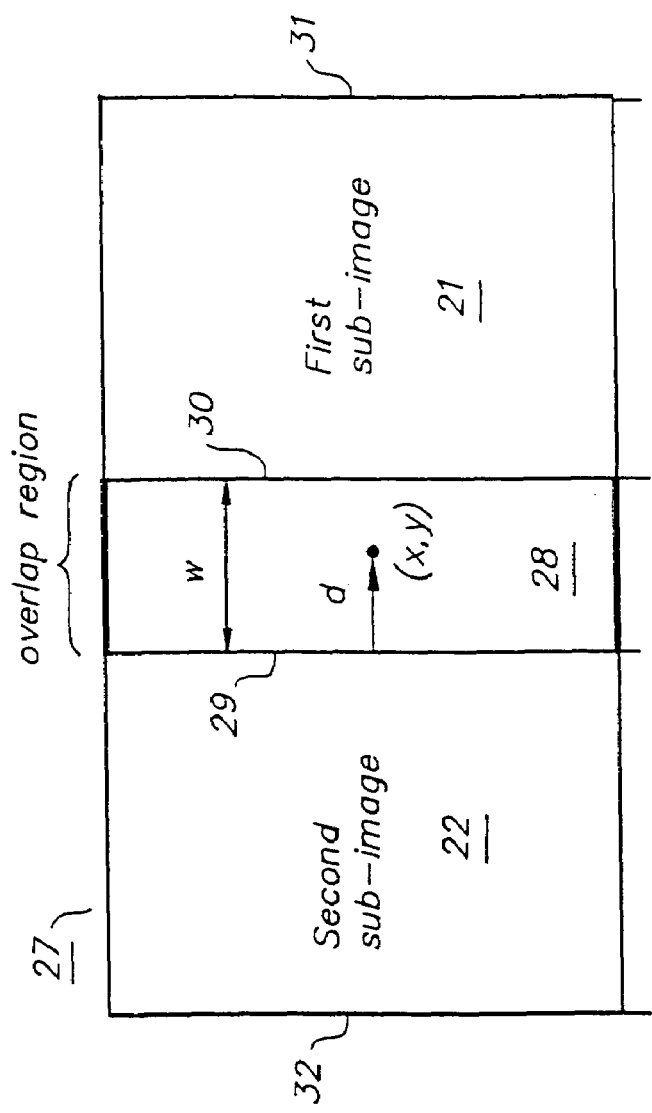
FIG. 3 shows a first and second sub-image along with an overlap region

The dislocation dx shown in FIG. 1 may either shift the sub-images 21 and 22 towards each other or away from each other. To cope with that problem, we have found that a suitable solution is to define, as shown in FIG. 3, an overlap region 28 around the junction 26. Within that overlap region, the first sub-image 21 gradually fades out and the second sub-image 22 gradually takes over from sub-image 22. FIG. 3 shows a reproduced image 27 on an image carrier. The reproduced image comprises a first sub-image 21 and a second sub-image 22. Both sub-images extend in an overlap region 28. The first sub-image 21 extends in the overlap region up to the peripheral edge 29; the second sub-image 22 extends in the overlap region up to the peripheral edge 30. According to FIG. 3, the first sub-image has another peripheral edge 31 on the image carrier; the second sub-image has also another peripheral edge 32. According to the current invention, between edge 32 and 29, only the second sub-image 22 contributes to the integral optical density of the image carrier between edges 29 and 30, i.e. within the overlap region, both the first sub-image and the second sub-image contribute in variable degree to the integral optical density of the image carrier; between edges 30 and 31, only the first sub-image 21 contributes to the integral optical density of the image carrier. In order to reproduce the original image, the above contributions must be in accordance with the image contents of the original image to be reproduced. To minimise the effect of dislocation problems, both the first and second sub-image 21 and 22 give variable contributions to the overlap region. Therefore, both the first and second sub-image 21 and 22 must have information about the original image to be reproduced in the overlap region 28. As such, the first sub-image 21 generated from the original image will be representative for the portion of the original image to be reproduced between edge 29 and 31; the second sub-image 22 generated from the original image will be representative for the portion of the original image to be reproduced between edge 30 and 32. Therefore, the first and second sub-image 21 and 22 will both comprise image information about the overlap region 28. The first and second sub-image 21, 22 will thus be conjoined, i.e. be joined together for a common purpose, i.e. to render or reproduce the portion of the original image within the overlap region 28. During imaging, the first and second sub-image are brought together so as to overlap in the overlap region 28.

Figure 4:
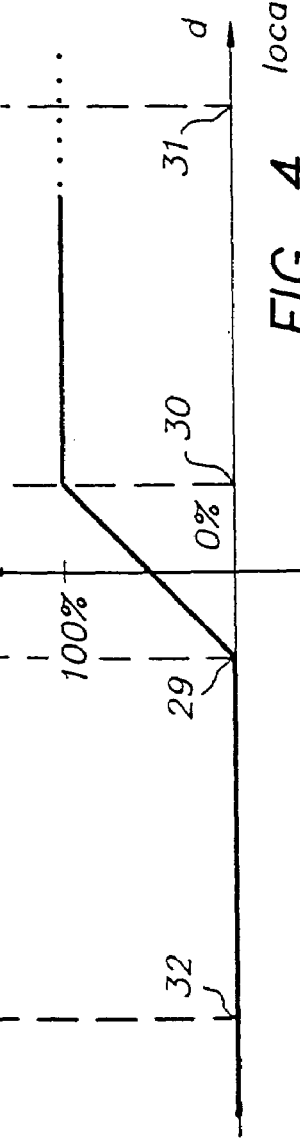
FIG. 4 shows the contribution of the first sub-image to the overlap region

The contribution to the integral optical density of the first sub-image 21 to the overlap region is sketched in FIG. 4. From edge 32 to edge 29, no contribution or 0% contribution is given to the image carrier by the first sub-image. As such, the imaging device for imaging the first sub-image 21 does not need to be capable to address the microdots in the region between edge 32 and 29. Between edge 30 and 31, the contribution to the density of the image carrier by the first sub-image 21 will be 100%, i.e. that region will be imaged by data contained in the first sub-image 21 only. This assertion is true as long as between edge 30 and edge 31 not another overlap region is situated. Within the overlap region 28, i.e. between the peripheral edge 29 of the first sub-image 21 and the peripheral edge 30 of the second sub-image 22, the contribution to the density of the first sub-image steadily increases from edge 29 to edge 30. At edge 29, that belongs both to the first sub-image 21 and to the overlap region 28, the contribution of the first sub-image is 0%. At edge 30 of the second sub-image 22, that belongs both to the second sub-image 22 and to the overlap region 28, and that is situated inside the first sub-image 21, the contribution of the first sub-image is 100%. Between these two edges 29 and 30 it is preferred that the contribution of the first sub-image 21 is in the range [0%, 100%] and preferably does not decrease as edge 30 is approached, i.e. there may be a region within the overlap region 28, where the contribution of the first sub-image 21 is constant as the edge 30 is approached. More preferably, that contribution is increasing as edge 30 is approached. The increase of that contribution may be linear, as shown in FIG. 4, but may also be non-linear. The function representing the per cent contribution as a function of the distance d from the edge 29 (or edge 30 for the contribution of the second sub-image) may have a convex or concave shape or a combination of both with inflexion point etc. It is clear that as the contribution of the first sub-image 21 increases, the contribution of the second sub-image will not increase, e.g. the contribution of the second image 22 may decrease within the overlap region 28 as the edge 30 is approached. In a preferred embodiment, the reproduced image must be such that there is a very close visual resemblance between:

the reproduction that could have been obtained by printing if the imaging device were capable to cover the whole width of the carrier; and, the reproduction that is obtained by printing the two sub-images according to the method of the current invention and with the assumption that no dislocation is present.

How this visual resemblance may be achieved is set out in more detail further below.

Depending on the capabilities of the imaging system—i.e. binary, multilevel or full continuous tone (contone)—and the preferred options, the increase of contribution may be realised by:

a) changing the dot percentage of the halftone screen; or,
b) changing the microscopic density of the microdots; or,
c) a combination of the above techniques.

The dot percentage of a region in a binary halftone image is defined as the number of microdots in that region having a high microscopic density, divided by the total number of microdots in that region. In a multilevel halftone image the dot percentage may be computed by assigning to each microdot in the region a value in the range [0.0,1.0] by taking a value 0.0 for microdots having the lowest microscopic density, a value 1.0 for microdots having the highest microscopic density, and a value between 0 and 1 commensurate to the microscopic density for microdots having an intermediate microscopic density. The dot percentage is then obtained by summing the assigned values over all microdots in the region and dividing that sum by the total number of microdots in that region. By the above methods, the dot percentage is obtained as a fraction in the range [0,1]. By multiplication with a factor 100, the dot percentage is expressed as a percentage value in the range of [0%, 100%].

In case of a binary imaging process, the option of increasing the contribution by varying the microscopic density of the microdots automatically results in at least one of the microdots having the lower density value, getting the higher density value, i.e. increasing the dot percentage of the binary system. Because the phase errors due to a dislocation dy (FIG. 1) are more conspicuous in an AM screen than in an FM screen, it is preferred to use FM screening techniques with stochastic distribution of the smaller halftone dots. The stochastic distribution of the FM halftone dots will smear the phase error due to dy over the image. In a preferred embodiment, each FM halftone dot comprises a matrix of 2×2 microdots. In a 600 dpi system, this gives a halftone dot resolution of 300 dpi.

A continuous tone system, also referred to as contone device, has the capability to generate multiple density levels with no perceptible quantization to them. The number of density levels is typically 256 or more. Agfa's Drystar 2000 is a typical 10-bit contone device, addressable by 1024 levels applied to a thermal head, addressing each individual microdot at a spatial resolution of 300 dpi. This system is manufactured and marketed by Agfa-Gevaert N. V. in Mortsel, Belgium. The required density of a microdot may be obtained by time modulation or amplitude modulation of an electronic signal. Agfa's LR5200™ is a 16-bit contone device, wherein an intensity modulated laser beam exposes a black and white photographic laser recording film of the type Scopix™ LT2B™ at a resolution of 600 dpi. In such contone systems, by modulation of the amount of heat or light generated by the imaging device, the contribution of the first and second sub-image may be decreased or increased in a continuous fashion. An original image having a constant tone level is reproduced by such systems by a structure-less image, i.e. the microdots in the reproduction all have an identical microscopic density level. No screening, rasterizing or dithering is visible, even not by a magnifying lens. Increasing the contribution of a sub-image in a contone system may be done preferably in a quasi continuous way, i.e. by modification of the value to drive the imaging device. In such system, the imaging device is operated for 100% in continuous tone mode: the translation of an image level of the original image into a drive signal does not depend on the location on the image carrier in non-overlap regions, as far as spatial corrections inherent to the imaging device are not considered. As the contribution of the first sub-image decreases as a function of the location in the overlap region, typically the contribution of the second sub-image increases as a function of that location. Within the overlap region, a first imaging device gives a contribution to the density of the image carrier and a second imaging device (or the first device at a later printing stage) gives such contribution at the same location. The contribution in the overlap region by each imaging device depends on the image signal from the original image and on the location within that overlap region. As set out below, a contribution processed tone value T' may be computed from a tone value T of the original image, according to $T'=T*f(d)$ or $T'=F(T,d)$. Instead of imaging the original tone value T, the first imaging device will image in the overlap zone the tone value T' and the second imaging device will image there a tone value T", e.g. computed according to $T''=T*f(W-d)$ or $T''=F(T,W-d)$ Binary and multilevel imaging systems require some form of halftoning, rasterizing or dithering for the faithful reproduction of continuous tone original images. Binary halftoning may require modified screening techniques to fade out the first sub-image while fading in the second sub-image within the overlap region. Multilevel halftoning has another degree of freedom with respect to binary halftoning, in that also the microscopic density of individual microdots may be varied by visible density steps. Most critical images for testing correctly fading in/out are original images having one single constant tone level, e.g. grey images. Screening with FM techniques gives better results in the overlap region than screening with AM techniques.

Theoretical simulation and practical experiments have shown that a stochastic (FM) screen for the first sub-image 21 having a dot percentage of 50% superposed on a stochastic screen for the second sub-image 22 having a dot percentage of 50%, does not result in a 100% dot percentage. There is an exception to this rule, where the high density halftone dots of the second halftone image exactly fit in the low density halftone dots of the first halftone image and vice versa, such as disclosed in EP-A-0 619 188. According to this arrangement, the screening method for the first sub-image is thus completely correlated to the screening method for the second sub-image. If however a dislocation having the size of one halftone dot occurs, the correlation is completely lost. It is thus preferred according to the current invention that for FM screening the screening method for the first sub-image is non-correlated to the screening method for the second sub-image, at least within the overlap region. The definition for a set of two non-correlated screening methods is as follows:

A first screened image is generated by the first screening method according to a first constant tone level $T_1$.

A second screened image is generated by the second screening method according to a second constant tone level $T_2$.

The second screened image is printed a first time on top of the first screened image and a first integral optical density $D_1$ of the result is measured.

A second time, the first and second screened images are generated. For a second time, the second screened image is printed on top of the first screened image, but now with a relative displacement of one microdot. A second integral optical density $D_2$ is measured.

The above procedure is repeated for all possible relative displacements and a mean density $D_m$ is computed.

The two screening methods are now uncorrelated if all measured densities $D_j$ fall within the range of [0.8 $D_m$, 1.2 $D_m$]. The above experiment may be easily simulated by a computer simulation, for which it is supposed that overprinting $D_1$ on $D_2$ results in a density $D=D_1+D_2$.

Overprinting 50% non-correlated dot screens on top of each other results in a dot percentage of about 75%. This is due to the fact that on the image carrier a high density microdot for the first sub-image may coincide either with a high or low density microdot for the second sub-image. The same applies for a low density microdot for the first sub-image. There is thus a "density deficiency" when "adding" two sub-images. For the above reason, in a preferred embodiment, at least one microdot in the overlap region, must get a microscopic density that is intermediate the lowest and highest microscopic density achievable for the microdots. The lowest achievable microscopic density is the integral density of the image carrier where it carries no ink, toner or minimal pigmentation. The highest achievable microscopic density is the integral density of the image carrier where it carries the maximum achievable amount of ink, toner or has maximal pigmentation. The intermediate microscopic density has a value that is preferably substantially different from the minimum and maximum integral optical density of the image carrier or of the minimum and maximum achievable microscopic density of the microdots. By substantially different is meant that the difference is at least 10% of the difference between the maximum and minimum density of the image carrier or microdots. This means that, if the minimum density is $D_{MIN}$ and the maximum density is $D_{MAX}$, then at least one intermediate microscopic density of a microdot in the overlap region must be in the interval of:

$$[0.9D_{MIN}+0.1D_{MAX}, 0.1D_{MIN}+0.9D_{MAX}]$$

The more intermediate densities are achievable by the imaging device, the better a smooth fit of the first sub-image and the second sub-image may be realised on the image carrier. If the imaging device is operated by a multilevel halftoning technique, preferably maximal use of the contone capabilities of the imaging device is made. This means that for reproducing an original image having one constant colour (e.g. only a specific grey), the microdots on the image carrier have a microscopic density within a narrow density interval, e.g. 20% of $D_{MAX}-D_{MIN}$, more preferably 10%.

Figure 5:
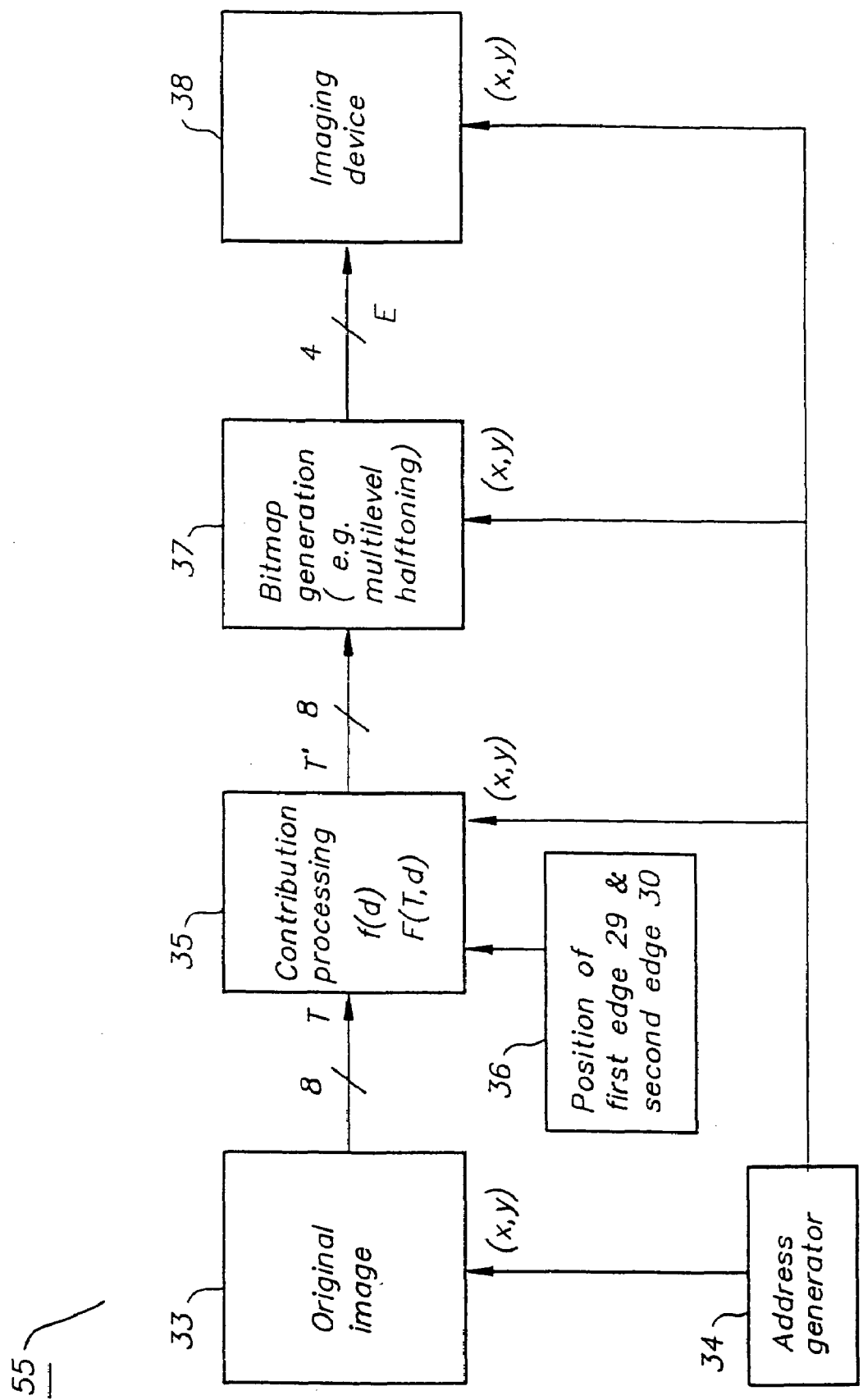
FIG. 5 shows a block diagram including contribution processing

The gradual transition from the first sub-image 21 to the second sub-image 22 in the overlap region may be realised for contone, multilevel and binary devices by the process of the imaging system 55 as sketched in FIG. 5. According to a specific embodiment, the original image 33 is an eight bit continuous tone image. Each grey level or tone value is represented by a value in the range of 0–255. An address generator 34 generates the position co-ordinates (x,y) for retrieving the original tone value T for the microdot to be imaged on the location (x,y) of the image carrier by the imaging device 38. The retrieved eight bit tone value T is transmitted to the contribution processing module 35. That module gets, apart from the tone value T, also the location (x,y) from the address generator 34 and the position of the two edges 29, 30 delimiting the overlap region 28. As long as the location (x,y) is not within the zone delimited by the two edges 29, 30, no transformation is done on the eight bit tone value T, i.e. the tone value T is sent to the next module 37 as T'=T, as it was received from the previous module 33. If on the other hand the location (x,y) is within the zone delimited by the two edges 29, 30, the tone value from the original image 33 undergoes a transformation. In the following it is supposed that a tone value T=0 results in the lowest optical density on the image carrier, whereas a tone value T=255 results in the highest optical density on the image carrier. If the first sub-image is imaged and the address generation module 34 generates an address (x,y) for a location situated on the edge 30 of the second sub-image, then the contribution processing module will allow the tone value T of the original image 33 to fully contribute to the density of the image carrier. This is achieved by transmission of that tone value T, without modification, to the next module 37 as T', i.e. T'=T. If (x,y) is located on edge 29 of the first sub-image, then the first sub-image must give no contribution to the density of the image carrier. According to the above convention, this is achieved by changing whatever tone value T from the original image 33 to a tone value of T'=0 for transmission to the next module 37. If (x,y) is located between edge 29 and 30, then a tone value T from the original image 33 will be transformed to a contribution processed tone value T'. With the above convention, tone value T' will have a value between 0 and T. According to a linear model, the tone value after contribution processing T' for the first sub-image 21 may be computed from the original tone value T by the following equation (see FIG. 3):

$$T'=d/w*T$$

W is the width of the overlap region, expressed e.g. in µm.
d is the distance between edge 29 and the point (x,y), expressed in the same metrics, e.g. µm, as W.
* means multiplication.

According to the above equation:
T'=0 for (x,y) on edge 29; and,
T'=T for (x,y) on edge 30.

According to such linear model, the contribution processed tone value T" for the second sub-image 22 may be computed from the original tone value T by the following equation:

$$T''=(W-d)/W*T$$

It has been set out before that combination of two sub-images may result in a density deficiency. Therefore, in a preferred embodiment the tone value after contribution processing is a non-linear function f( ) of the distance d:

$$T'=f(d)*T$$

Preferably, f(d) is a non-descending function, i.e. as d grows from 0 to W, f(d) is either increasing or constant. More preferably, f(d) is an ascending function, e.g. the first derivative f'(d) of the function f(d) is positive over the interval [0, W]. Preferably f(0)=0 and f(W)=1 for the first sub-image. For the second sub-image, the function f(d') may be used, where d'=W−d.

According to another embodiment, the per cent attenuation of the density is not only a function of the distance of (x,y) from the edge 29, but also a function of the original tone value, i.e.:

$$T'=F(T,d)$$

The equation T'=f(d)*T is a special case of the equation T'=F(T, d).

Preferably F(T, 0)=0 and F(T, W)=T for all tone values T.

The design of the functions f(d) and F(T,d) will be set out below.

The contribution processed tone values T' are sent to the bitmap generation module 37. That module converts in the usual way tone values T' to engine value E, suitable for driving the imaging device 38. If the imaging device 38 is a contone device, such as the Agfa Drystar 2000 10-bit colour printer, addressed by a 10-bit engine value E, the bitmap generation module 37 transforms each tone value T' to an engine value E independently from the location (x,y) on the carrier. According to the current example, the 8-bit tone value T' is thus transformed to a 10-bit engine value E. This transformation may be realised by a look up table (LUT) having 256 entries and output values in the range of 0–1023. If the imaging device 38 has multilevel capabilities, such as the Chromapress system, or is a binary imaging device, such as a graphical imagesetter or a platesetter for lithographic printing plates, the bitmap generation module 37 will transform the 8-bit tone value T' to a specific engine value E, according to the location (x,y) where the tone value T' belongs to. Such transformation E=H(T',x,y), referred to as (multilevel) halftoning is described in detail in EP-A-0 634 862 and EP-A-0 748 109.

According to an alternative embodiment, the modules 35 and 37 may be integrated for generating a (multilevel) halftone image for a binary or multilevel imaging device 38. In regions outside the overlap region, (multilevel) halftoning is performed by making use of traditional threshold matrices or transformation tiles. For regions situated within the overlap zone, specific threshold matrices or transformation tiles may be designed for controlling the contribution of sub-images to the density of the image-carrier. The engine values E generated by bitmap generation device 37 are then transmitted to the imaging device 38 for imaging the sub-image. After imaging the complete first sub-image, the second sub-image may be imaged by the same imaging device. Alternatively, two systems according to FIG. 5 are present in the imaging system, both systems having an imaging device, capable to operate in parallel. The first imaging device will then image the first sub-image, the second imaging device will image the second sub-image.

If the imaging device is a contone device as defined before, then a smooth fit of two sub-images in the overlap region is possible. If the imaging device is a binary device, such as a platesetter for a lithographic printing plate, a P3400PS binary electrophotographic printer, a binary thermographic printer etc., then it is preferred, due to the risk of phase errors, that the bitmap generator 37 generates a binary halftone image according to a stochastic screening technique (FM screening) for the imaging device 38.

In order to determine suitable contribution functions f(d) or F(T,d), various monochrome experiments have been set up by using the Chromapress system. This 600 dpi LED-based electrophotographic system is capable to print duplex colour images on a web material.

At each side, the web material sequentially contacts five photosensitive drums. Each drum carries a toner image, the toner being supplied from a toner delivery means or toner station. In normal operation, the toner stations may be filled with colour toners: cyan, magenta, yellow and black. Each drum comprises means for adjusting dx and dy as shown in FIG. 1. In the experiment the toner station for black and that for magenta toner were both filled with black toner. The drum for black toner was used for imaging the first sub-image 21, the drum for magenta toner—for the experiments provided with black toner—was used to image the second sub-image 22. The adjusting means were deregulated to purposively introduce dislocations dx and dy for simulation experiments. It has been found that if the overlap region 28 has a size W of 8 to 16 mm, then dislocations between −200 µm and +200 µm may be absorbed, when imaged by the method according to the current invention. Also overlap zones of 2 mm up to 8 mm give suitable results. For 600 dpi inkjet systems printing in bands, an overlap region, imaged according to the current invention, and having a width of 4 to 5 mm gives very acceptable results. Experiments have shown that in the 600 dpi Chromapress system, dislocations between −30 and +30 µm or even between −40 µm and +40 µm may be invisible even without compensation according to the current invention. The disturbance caused by a clear or dark line having a width of 40 µm may be visible by the naked eye from a short viewing distance (20–50 cm). Such line having a width of 100 µm (0.1 mm) is acceptable only from a larger viewing distance (larger than 1 m).

Figure 7:
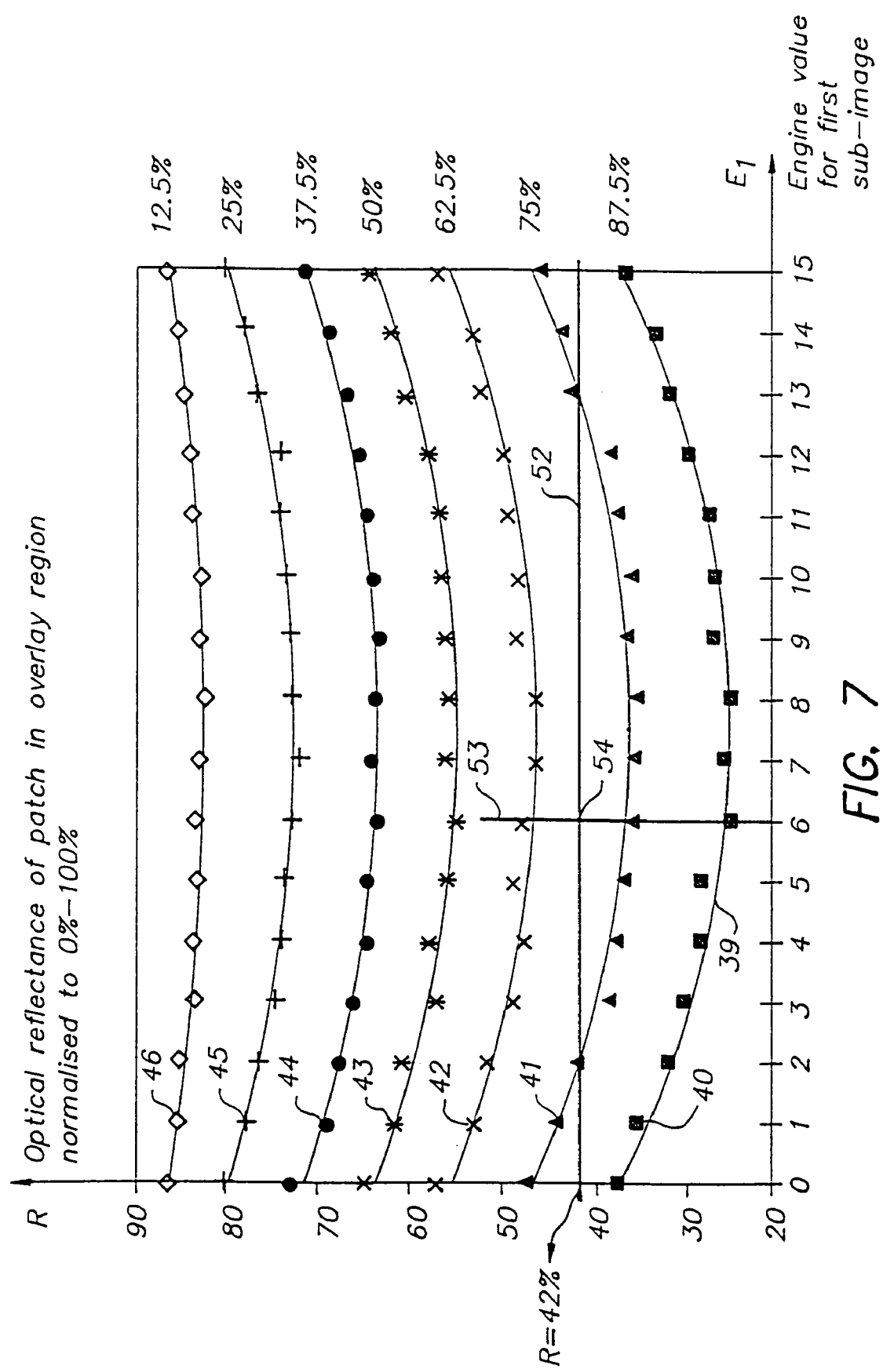
FIG. 7 shows the measured optical reflectance of a patch in an overlay region according to FIG. 6, imaged by specific engine values E for the first and the second sub-image and having a specific percentage of non-blank halftone dots

To evaluate the effect of overprinting sub-images in the Chromapress system and accordingly to devise suitable contribution functions f(d) or F(T,d), the following experiments were done. A 300 dpi stochastic screen, referred to as Agfa CristalRaster (trademark of Agfa-Gevaert N. V.), was programmed in the bitmap generation module 37 for the imaging device for imaging the first sub-image, referred to as the first imaging device. Screening was done according to a 128×128 tile, within the meaning as described in EP-A-0 682 438. The CristalRaster screen was also programmed for the imaging device for imaging the second sub-image, referred to as the second imaging device. The Chromapress is a 600 dpi system. Each FM halftone dot was formed by a matrix of 2×2 microdots. For the first experiment, schematically shown in FIG. 6a, 100% halftone dots were printed for both the first sub-image 21 and the second sub-image 22. By 100% halftone dots is meant that each halftone dot on the carrier gets the specified microscopic density. Thus, for 100% halftone dots, no halftone structure is present, since all microdots within one patch get the same microscopic density. The first sub-image 21 is divided in 16 patches, numbered from 0 to 15. According to the experiment, each patch of the first sub-image is imaged with the engine value displayed in the patch. Therefore, the patch labelled 0 in the lower right hand corner of FIG. 6a was completely white, since an engine value E=0 corresponds with the minimum optical density, obtained by depositing no black toner. The patch labelled 15 in the upper right hand corner of FIG. 6a was completely black. This is due to the fact that each microdot within that patch got an engine value 15, corresponding to the highest amount of toner that can be deposited by the imaging device. Each individual patch of the first sub-image labelled with 1–14 also had a homogenous distribution of toner particles; the patch labelled 1 had small amounts of toner particles on each microdot, the patch labelled 14 large amounts, but smaller than the toner amounts in the patch labelled 15. The second imaging device was used to image the second sub-image 22 in FIG. 6a. The patch labelled with 0 got no toner, each microdot within the patch labelled 15 got a maximum amount of black toner. The patches labelled 1–14 got intermediate amounts of toner, equally distributed over all microdots in the patch, the amounts being commensurate the label value 1–14. Both the first and second imaging device were used to image the overlap region 28. Again 16 patches were imaged differently. The patch in FIG. 6a labelled 0/15 got no toner from the second imaging device and got a maximum amount of toner from the first imaging device. In the patch labelled 15/0, the situation was reversed. In the patch labelled 3/12, the first sub-image 21 contributed to the overlap region 28 with an engine value $E_1=12$ and the second sub-image 22 contributed to the overlap region 28 with an engine value $E_2=3$. Thus in fact, the first imaging device printed 16 different rectangular homogeneous patches, spanning the overlap region 28 and the first sub-image 21; the second imaging device printed 16 different rectangular homogeneous patches, spanning the overlap region 28 and the second sub-image 22. The 16 patches 0/15–15/0 of the overlap region 28 all had a high optical density. This density was measured by a densitometer. The measured values may be plotted as shown in FIG. 7. On the horizontal axis the engine value $E_1$ for the first sub-image is plotted. From FIG. 6a it is clear that the engine value $E_2$ of the patch plotted by the second imaging device on top of the patch plotted by the first imaging device within the overlap region 28 fulfils the equation: $E_2=15-E_1$. On the vertical axis of FIG. 7, the optical integral reflectance R of the patch in the overlay region 28 is plotted. The measured values for the overlap region 28 in FIG. 6a all had a reflectance value R below 20% and were not plotted in FIG. 7 accordingly.

Figures 6, 6A, 6B, 6C, 6D, 6E, 6F, 6G, 6H:
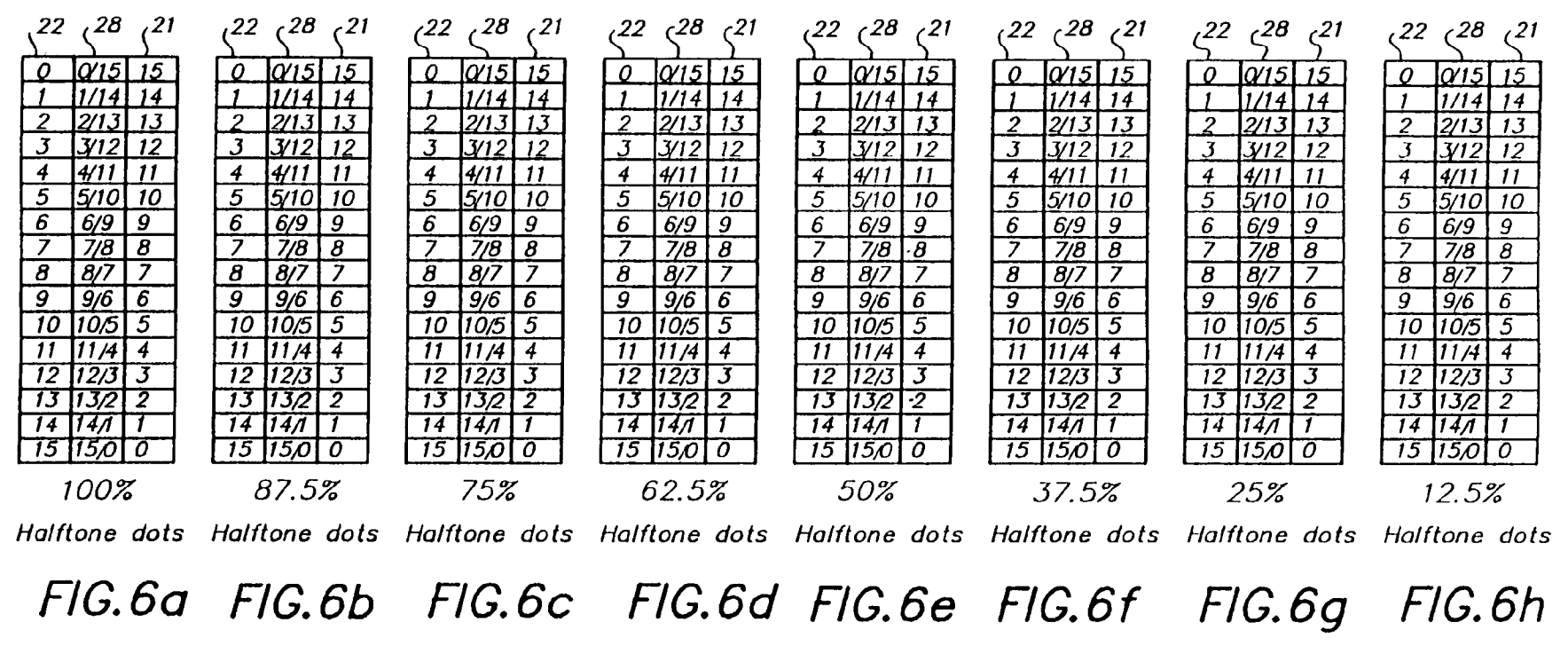

The above described experiment is repeated as shown in FIG. 6b. There is however an important difference: only 87.5% of the halftone dots of the first sub-image or the second sub-image take the engine value $E_1$ or $E_2=15-E_1$ respectively. The other 12.5% of the halftone dots of the first sub-image 21 and the second sub-image 22 take the engine value E=0, i.e. no toner is deposited on these halftone dots, referred to as blank halftone dots. The blank halftone dots are stochastically distributed in the patches, according to he CristalRaster FM screening technique. The patch on the lower left hand corner of FIG. 6b has been imaged by the second imaging device with engine value $E_2=15$, i.e. each non-blank halftone dot gets a maximum amount of toner, whereas each blank halftone dot, i.e. 12.5% of the halftone dots within that patch, gets no toner. The patch on the lower right hand corner designated with 0 corresponds to $E_1=0$, i.e. no toner is deposited on any microdot. The patch annotated with 15/0 in the overlap region 28 of FIG. 6b results from overprinting the second sub-image 22 having a dot percentage of 87.5% on top of the first sub-image 21, having a dot percentage of 0%. That 15/0 patch has the same structure as the 15 patch in the second sub-image 22. The reverse operation is applied on the patch labelled 0/15 in FIG. 6b. The patch labelled 4/11 in FIG. 6b is the result of overprinting patch 4 of the second sub-image 22 on patch 11 of the first sub-image 21. In this 4/11 patch four types of microdots are present:

1. $E_1=0$ and $E_2=0$: neither the first nor the second imaging device deposit any toner on the microdot. The microdot has minimal microscopic density.
2. $E_1=0$ and $E_2=4$: the first imaging device deposits no toner, the second imaging device deposits an intermediate amount of toner, e.g. ca. 4/15 of the maximal amount. The microdot in the patch 4/11 in the overlap region 28 has a low microscopic density.
3. $E_1=11$ and $E_2=0$: the second imaging device deposits no toner, the first imaging device deposits an intermediate amount of toner, e.g. ca. 11/15 of the maximal amount. The microdot in the 4/11 patch has a relatively high microscopic density.
4. $E_1=11$ and $E_2=4$: the first imaging device deposits a relatively high intermediate amount of toner, e.g. ca. 11/15 of the maximal amount; the second imaging device deposits a relatively low intermediate amount of toner, e.g. ca. 4/15 of the maximal amount. The microdot has a high microscopic density, due to deposition of a small amount of toner on top of a larger amount of toner.

Since only 12.5% of the halftone dots of the first sub-image and the second sub-image are blank halftone dots, and the FM screen for the first sub-image is non-correlated to the FM screen for the second sub-image, the situation under point 1 is exceptional: the chance that the halftone dot is blank by the first sub-image is 12.5% or ⅛; the chance that this dot is blank by the second sub-image is 12.5% or ⅛; accordingly the chance that a halftone is blank in the overlap zone, i.e. case 1, is 0.125*0.125=0.016 or 1/64. Case 2 and 3 have both a chance of 7/64. Case 4 has a chance of 49/64.

Again the integral optical density of the patches 0/15 to 15/0 of the overlap zone 28 in FIG. 6b was measured. The results are plotted on FIG. 7 by the square marks indicated by 40. A smooth line 39 approximating these measured data was fitted along these points 40 and represented in FIG. 7 accordingly.

The same experiment was done according to FIG. 6c, where 75% of the halftone dots are non-blank, i.e. get the engine value E as labelled in the patch. As such, 25% of the randomly distributed halftone dots get no toner, by assigning E=0 to them. Again the integral density of the overlap zone was measured and the corresponding optical reflectance was plotted by symbol 41 in FIG. 7.

The experiment according to FIG. 6d refers to 62.5% non-blank halftone dots; the reflectance was plotted by symbol 42 in FIG. 7. The reflectance indicated by symbol 43 in FIG. 7 corresponds to 50% non-blank halftone dots in FIG. 6e; symbol 44 corresponds to 37.5% in FIG. 6f; symbols 45 and 46 correspond to 25% and 12.5% non-blank halftone dots in FIG. 6g and 6h respectively. For all the measured points in FIG. 7, a continuous function $R=f(E_1)$, such as represented by curve 39, was established, for approximating the measured points for one specific percentage. The curve 39 according to this function for 87.5% CristalRaster is shown in FIG. 7. In an alternative embodiment, not the optical reflectance R is displayed as a function of the Engine value, with the percentage as parameter, but the lightness L according to CIE (Commission Internationale de l'Eclairage) instead of R. The approximating function $L=f(E_1)$ will give a slightly different approximation, since lightness L is not a linear function of reflectance R, nor density D.

To achieve a certain optical reflectance, e.g. R=42% by overprinting sub-images, one may select the required reflectance value R=42% on the vertical axis of FIG. 7 and draw a horizontal line 52. Vertical lines may be drawn from the engine values 1–15 on the horizontal axis. Wherever the intersection of the horizontal line 52 and each one of the vertical lines comes close to one of the marks 40–46, according to the current example marks 41 and 42, that combination of engine values $E_1$ and $E_2$ along with the corresponding percentage of non-blank halftone dots may be selected to achieve the required optical reflectance. Alternatively, the engine value $E_1$ may be selected according to the position d (FIG. 3) within the overlap region 28. If the engine value has an integer value from 0 to 15, then $E_1$ may be selected according to the following equation:

$$E_1=[16.0*d/W]$$

The operation y=[x], where x is a real number and y is an integer number, means that y is the integer value lower than or equal to x. If $E_1$ equals 16, $E_1$ is set to 15.

In order to make use of the graphs of FIG. 7, $E_2=15-E_1$. Suppose that $E_1=6$. Then a vertical line 53 starting at $E_1=6$ may be drawn. The intersection 54 of the horizontal line 52 and the vertical line 53 is situated between a mark 41 corresponding to 75% and a mark 42 corresponding to 62.5%. Now a percentage between 62.5% and 75% may be computed based on the distance between the point 54 and the respective marks or more exactly the corresponding smoothing curves. If the computed per cent is 69%, then a 69% non-blank FM screen may be used for both the first and second sub-image at the location where R=42% must be achieved. All these operations may be automated by a computer system or in hardware, by making use only of the numerical representations of the curves such as 39.

Figure 8:
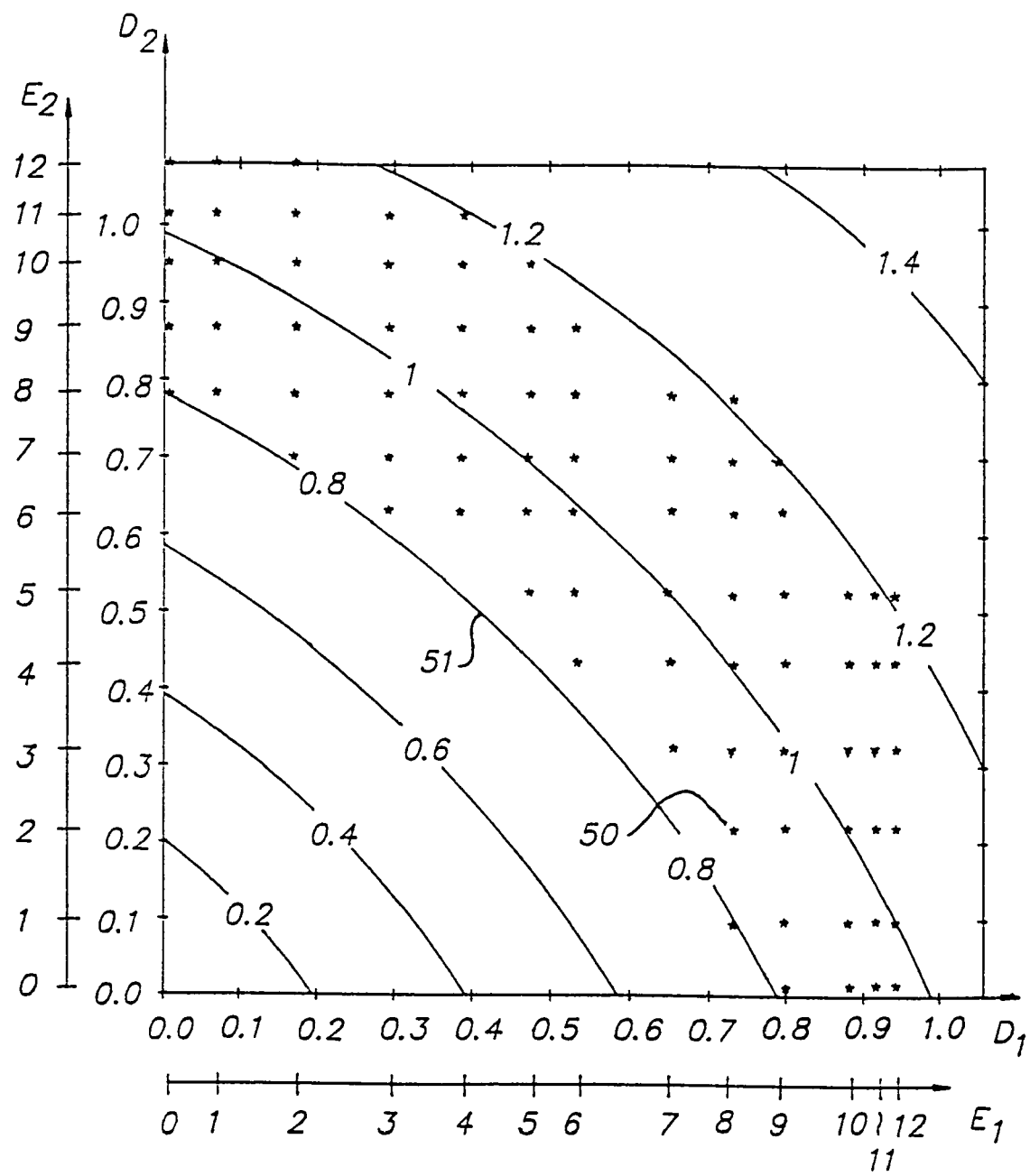
FIG. 8 shows curves corresponding to a constant density value, connecting ($E_1$, $E_2$)-pairs giving that density shows patches generated by all possible combinations of engine values $E_1$ and $E_2$.
Figure 9:
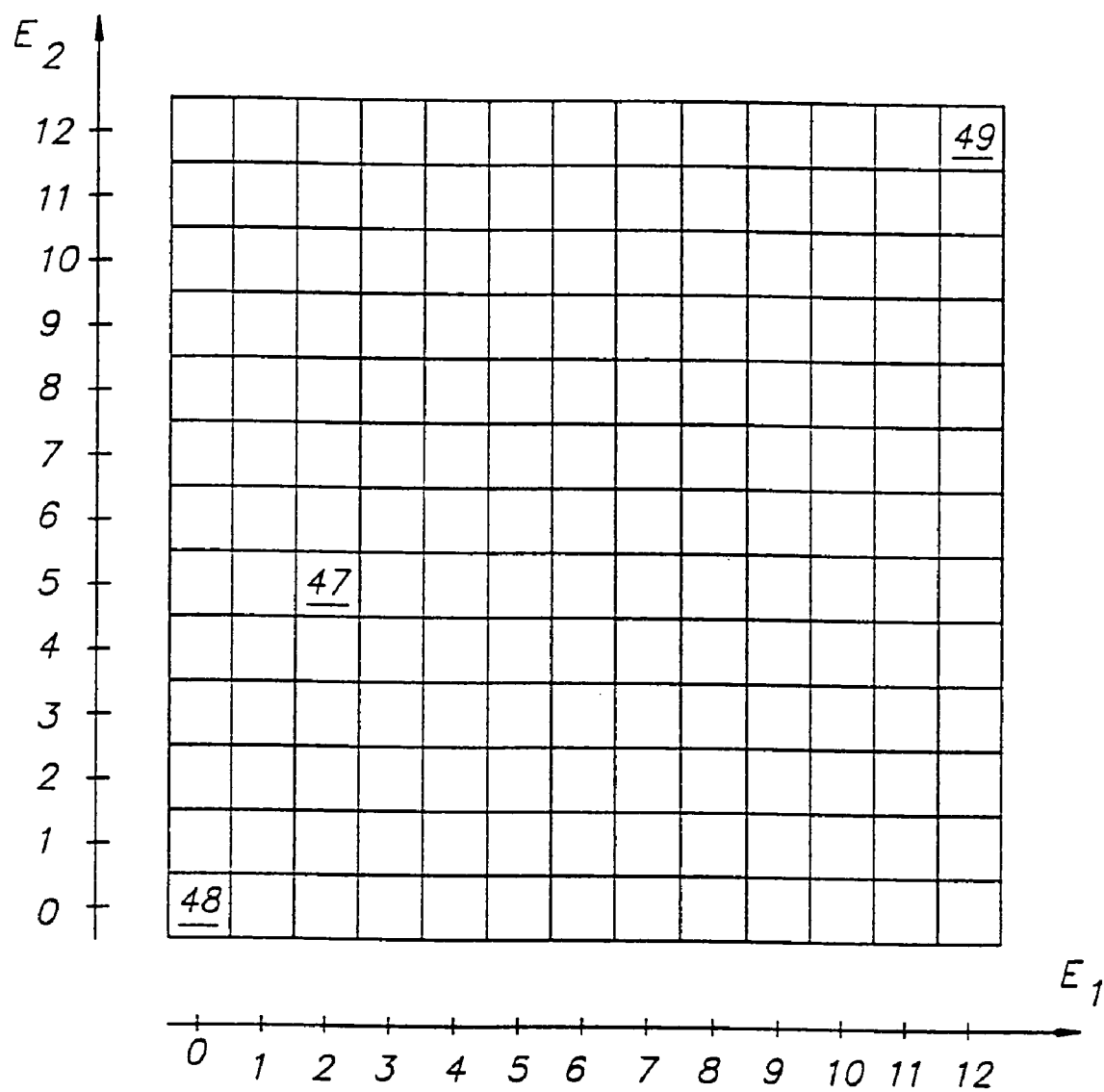
FIG. 9 shows patches created to obtain the curves of FIG. 8.

A second test was done on the Chromapress system, in order to define iso-intensity-curves as shown in FIG. 8, i.e. curves in a two-dimensional ($E_1$, $E_2$)-space giving the geometrical locus for which the intensity, integral optical density or lightness of the image carrier is constant. To obtain these curves, 169 patches arranged as shown in FIG. 9 were created. Each patch was an overprint of two sub-images, where each microdot within the patch received from the first imaging device an amount of toner commensurate $E_1$, and each microdot within the patch received from the second imaging device an amount of toner commensurate $E_2$. The level according to the first sub-image is shown on the horizontal axis $E_1$, the level for the second sub-image is shown on the vertical axis $E_2$. For example, each microdot in patch 47 got an amount of toner from the first imaging device dictated by the level $E_1$=2, and from the second imaging device by the level $E_2$=5. According to the above convention, E=0 corresponds to no toner. As such, patch 48 has the lowest optical density since it received no toner at all, i.e. from none of both imaging devices; patch 49 has the highest optical density, since it received from the first and second imaging device a maximum amount of toner. First, the densities $D_1$ for the patches with $E_2$=0, i.e. the second sub-image depositing no toner, and $E_1$ ranging from 0 to 12, were measured. These densities were set out in FIG. 8 on a linear scale $D_1$. This gave the non-linear scale $E_1$ in FIG. 8. For example, $E_1$=6 with $E_2$=0 resulted in a density of ca. 0.54. The same procedure was applied for varying engine values for the second imaging engine and the first imaging engine depositing no toner. This gave the vertical linear scale $D_2$ and the non-linear scale $E_2$ in FIG. 8. Thereafter, the density of all 144 remaining patches was measured, and those patches having a density between 0.8 and 1.2 were represented by an asterisk 50 in FIG. 8. With each asterisk 50, a measured density is associated. Therefore, a surface in three-dimensional space ($E_1$, $E_2$, D) is defined, D being the density measured on patch ($E_1$, $E_2$) The analytical form of this surface is obtained by approximating the measured values $D_i$ by a fitting surface. Cutting this surface by a horizontal plane for D=0.8 and projecting the curve of intersection to the ($D_1$, $D_2$)-plane, gives the iso-density curve 51. The other curves in FIG. 8 representing densities 0.2, 0.4, . . . 1.4 were obtained likewise.

To obtain a specific density, e.g. D=0.82, in the overlap region, one may establish the iso-density curve as sketched above for D=0.82. This curve travels from the horizontal axis $D_1$ to the vertical axis $D_2$. This curve may be divided in equal curve segments, the number of segments being equal to the number of microdots in the shortest line from edge 29 to edge 30 in FIG. 3. Each microdot on that line is assigned consecutively to a curve segment:

1. The microdot situated on edge 29 is assigned to the segment starting on the vertical $D_2$ axis, at $D_2$=0.82. As such for the microdots situated on edge 29, the contribution to the density will come from $E_2$, i.e. the second imaging device only.

2. the microdot situated on edge 30 is assigned to the segment starting on the horizontal $D_1$ axis, at $D_1$=0.82. As such for the microdots situated on edge 30, the contribution to the density will come from $E_1$, i.e. the first imaging device only.

The more the microdots are situated closely to edge 29, the closer the corresponding segment is situated to the $D_2$ axis. The required engine values $E_1$, $E_2$ to obtain the desired density of D=0.82 at a specific microdot located at position d (FIG. 3), are then found on FIG. 8 as follows:

$E_1$ by drawing a vertical line
from the line segment corresponding to the specific microdot
to the horizontal $E_1$ axis, and reading there the $E_1$ value;
$E_2$ by drawing a horizontal line
from the line segment corresponding to the specific microdot
to the vertical $E_2$ axis, and reading there the $E_2$ value.

Finding $E_1$ and $E_2$ are two separate and independent operations, performed for the same image pixel of the original image. Ideally $E_1$ and $E_2$ are imaged on the same microdot, but due to dislocations dx, dy, they may be imaged on different microdots. $E_1$ and $E_2$ obtained by the above method may be non-integer values. The engine however can be driven only by integer values. For converting the non-integer value to the integer value, rounding may be used, i.e. a fraction lower than 0.5 is omitted, other fractions lead to the next higher integer value. Alternatively, one of the two integer values closest to the non-integer value may be selected at random. In a preferred embodiment, a random number r with a constant or homogeneous distribution is generated in the interval (0, 1) (0 included, 1 not). The number r is added to the non-integer E-value. From that sum the fraction is discarded, giving the integer E-value. By this operation, non-integer E-values close to an integer value have more chance to be transformed to that closer integer value. Also this operation is done preferably independently for $E_1$ and $E_2$ since due to the uncertainty about the dislocations, it is not guaranteed that the engine value $E_2$ will be printed on top of the engine value $E_1$. The method described herein above may be repeated for all density values D or their original tone values T and for all locations d (FIG. 3) within the overlap region 28. As such, a function E=E(T,d) is obtained for the first and second imaging device. This function may be incorporated in the contribution processing module 35 as shown in FIG. 5, to deliver a value T' such that the bitmap generation module 37 delivers the required engine value E. Alternatively, the tile for halftoning contone values T' to multilevel values E, and stored in the bitmap generation module 37, may be different for overlap and non-overlap regions. In such case, module 36 gives also a signal to the bitmap generation module 37, such that this module may decide to use either the usual tile or the tile for overlap regions.

For contone devices, increasing the contributions by an overlapping sub-image is preferably done by increasing the microscopic density of the microdots as for constant tone values of the original image these microdots get more distance from the peripheral edge of that sub-image. For contone images, the microscopic density may be increased by small density steps. These density steps $\Delta D$ are smaller than half the density difference between the maximum $D_{MAX}$ and minimum $D_{MIN}$ microscopic density achievable on a microdot, i.e.

$$\Delta D < (D_{MAX} - D_{MIN})/2.$$

For binary devices, increasing the contributions by an overlapping sub-image is preferably done by increasing the dot percentage. Preferably, the screening method used is a frequency-modulated halftone screening and in the overlap region, the screening method for the first sub-image is preferably non-correlated to the screening method for the second sub-image.

For multilevel devices, a mix of the above two methods for contone and binary devices may be used.

LIST OF REFERENCE SIGNS dx: dislocation orthogonal to printing direction
dy: dislocation parallel to printing direction
T: tone value of a pixel of the original image 33
T': tone value of a pixel after contribution processing
21: first sub-image
22: second sub-image
23: printing direction
24: line direction
25: microdot
26: junction
27: reproduced image
28: overlap region
29: peripheral edge of first sub-image in overlap region
30: peripheral edge of second sub-image in overlap region
31: peripheral edge of first sub-image, outside overlap region
32: peripheral edge of second sub-image, outside overlap region
33: original image
34: address generator
35: contribution processing
36: position of first edge 29 and second edge 30 in overlap region
37: bitmap generation (e.g. multilevel halftoning)
38: imaging device
40: symbol for measured reflectance of patch in overlap region according to FIG. 6b (87.5% FM raster)
41: symbol for measured reflectance of patch in overlap region according to FIG. 6c (75% FM raster)
42: symbol for measured reflectance of patch in overlap region according to FIG. 6d (62.5% FM raster)
43: symbol for measured reflectance of patch in overlap region according to FIG. 6e (50% FM raster)
44: symbol for measured reflectance of patch in overlap region according to FIG. 6f (37.5% FM raster)
45: symbol for measured reflectance of patch in overlap region according to FIG. 6g (25% FM raster)
46: symbol for measured reflectance of patch in overlap region according to FIG. 6h (12.5% FM raster)
47: patch with $E_1=2$ and $E_2=5$
48: patch with $E_1=0$ and $E_2=0$
49: patch with $E_1=12$ and $E_2=12$
50: asterisk representing a patch $E_1$, $E_2$
51: iso-density curve for D=0.8
52: horizontal line at R=42%
53: vertical line at $E_1=6$
54: intersection of horizontal line 52 and vertical line 53
55: imaging system

The invention claimed is:

1. A system for reproducing an original image on an image carrier, the system comprising:
   means for generating a conjoined first and second sub-image, each representative for a portion of said original image;
   means for defining an overlap region as a region where both sub-images give a contribution to the integral optical density of the image carrier;
   means for dividing said overlap region in a partition of microdots;
   means for establishing for each sub-image a peripheral edge in said overlap region;
   means for assigning to at least one microdot an intermediate microscopic density substantially different from a minimum and maximum microscopic density of microdots; and
   means for increasing said contribution by said first sub-image from said peripheral edge of said first sub-image to said peripheral edge of said second sub-image in a density increment smaller than half a difference between the minimum and maximum microscopic densities of said microdots.

2. The system according to claim 1, further comprising:
   means for generating for a zone in said overlap region by said first sub-image a first per cent of blank microdots;
   means for generating for said zone by said second sub-image a second per cent of blank microdots, said second per cent being equal to said first per cent.

* * * * *

UNITED STATES PATENT AND TRADEMARK OFFICE
CERTIFICATE OF CORRECTION

PATENT NO.         : 7,231,096 B2                                    Page 1 of 1
APPLICATION NO. : 10/695118
DATED              : June 12, 2007
INVENTOR(S)        : Broddin et al.

It is certified that error appears in the above-identified patent and that said Letters Patent is hereby corrected as shown below:

Title Page; item (63);
Please add to the front page of the patent.

-- Related U.S. Application Data
This application is a divisional of US patent application no 09/427,810 filed
on October 27, 1999 and issued as US patent no. 6,690,837 on February 10, 2004 which
in turn claims priority to Provisional application no. 60/112,310
filed on December 14, 1998. -- item (30); insert;

-- Foreign Application Priority Data
EP98203869 filed on November 3, 1998. --

Signed and Sealed this

Sixth Day of May, 2008

JON W. DUDAS
*Director of the United States Patent and Trademark Office*